United States Patent [19]

Searfoss et al.

[11] 4,187,209

[45] * Feb. 5, 1980

[54] BRAKE BLOCK MATERIAL

[75] Inventors: William H. Searfoss; Gerald P. Jones, both of Ridgway, Pa.

[73] Assignee: Molded Materials Company, Div. Carlisle Corporation, Ridgway, Pa.

[*] Notice: The portion of the term of this patent subsequent to Apr. 17, 1979, has been disclaimed.

[21] Appl. No.: 957,864

[22] Filed: Nov. 6, 1978

Related U.S. Application Data

[63] Continuation-in-part of Ser. No. 904,613, May 10, 1978.

[51] Int. Cl.² .......................... C08K 3/22; C08K 3/30; C08K 3/32
[52] U.S. Cl. ....................................................... 260/38
[58] Field of Search .......................... 260/38, DIG. 39

[56] References Cited

U.S. PATENT DOCUMENTS

| | | | |
|---|---|---|---|
| 3,227,249 | 1/1966 | Kuzmick | 260/DIG. 39 |
| 3,365,041 | 1/1968 | Stormfeltz | 192/107 |
| 3,390,750 | 7/1968 | Albertson | 192/107 |
| 3,526,306 | 9/1970 | Bentz et al. | 192/107 |
| 3,725,334 | 4/1973 | Popp et al. | 260/DIG. 39 |
| 3,896,075 | 7/1975 | Longley | 260/38 |
| 3,934,686 | 1/1976 | Stimson et al. | 188/251 A |
| 3,956,545 | 5/1976 | Afflerbach et al. | 428/37 |
| 3,959,194 | 5/1976 | Adelmann | 260/17.2 |
| 3,959,208 | 5/1976 | Baskin | 260/DIG. 39 |
| 4,125,496 | 11/1978 | McGinnis | 260/DIG. 39 |

*Primary Examiner*—Sandra M. Person
*Attorney, Agent, or Firm*—Webster B. Harpman

[57] ABSTRACT

Low abrasion, heat resistant, high strength friction material with a high resistance to wear is described as containing phenolic resin, an organic modifier, processed mineral fibers and a filler. Rubber, either natural or synthetic, graphite, a metallic oxide, a color pigment, and factice may also be present. The material finds particular use in friction materials for brake blocks, drum brake linings and disc pads for vehicle braking systems and the like.

6 Claims, No Drawings

BRAKE BLOCK MATERIAL

This is a continuation in part of Ser. No. 904,613, filed May 10, 1978.

BACKGROUND OF THE INVENTION (1) Field of the Invention

This invention relates to friction materials such as used in brake blocks, drum brake linings and disc pads in vehicle braking systems.

(2) Description of the Prior Art

The prior art friction materials have typically included rubber and resin binders, inorganic fillers and asbestos fibers. Glass fibers and glass strands have also been present in the prior art materials as have metal fibers.

The present invention utilizes a processed mineral fiber formed of blast furnace slag such as known in the art as spun slag. The spun slag fibers in combination with the other materials used as disclosed herein result in an unusually efficient brake block material having none of the disadvantages in manufacture or use that have been commonly associated with asbestos fibers in the past.

U.S. Pat. No. 3,365,041 of Jan. 23, 1968 discloses a friction material in the form of a clutch facing which incorporates asbestos fibers and is typical of the prior art.

U.S. Pat. No. 3,390,750 of July 2, 1968 incorporates porous sintered metal fibers in a friction element, for example stainless steel fibers.

U.S. Pat. No. 3,526,306 of Sept. 1, 1970 discloses the use of glass yarn, asbestos, fibers, and fine metal wires in a friction element comprising a clutch facing.

U.S. Pat. No. 3,934,686 of Jan. 27, 1976 discloses a friction element in which random textile fibers and/or boron fibers are present.

U.S. Pat. No. 3,956,545 of May 11, 1976 relates to a glass fiber friction element and U.S. Pat. No. 3,959,194 of May 25, 1976 discloses a brake shoe material incorporating cellulosic and/or asbestos fibers.

The present invention differs from the prior art primarily in the utilization of fibers spun from blast furnace slag and the unusual wear and heat resistance qualities of the material resulting from their use.

SUMMARY OF THE INVENTION

A consistently wear and heat resistant material capable of safe and economic manufacture and use can be made from a composition comprising 20% to 75% by weight of fibers spun from blast furnace slag, 13% to 33% by weight phenolic resin and associated modifier such as a GRS polymer, and 10% to 35% by weight barytes. Variations of the invention may incorporate 3% to 8% by weight powdered or flaked grahite, 0.05% to 3% by weight of a metallic oxide, 1% to 4% by weight of a color pigment, such as carbon black, and 3% to 9% by weight of rubber, natural or synthetic.

DESCRIPTION OF THE PREFERRED EMBODIMENT

The composition of this invention is a material satisfactory for the manufacture of brake blocks, pads, and the like as used in drum and disc brake applications on various vehicles and particularly heavy duty trucks and the like. The composition of this invention is a material which incorporates processed mineral fibers which are spun from blast furnace slag and these fibers, which in a typical example of the invention will be present in an amount approximately 30% by weight, combine readily in the mixing and manufacturing process with phenolic resin 14% by weight and an organic modifier 13% by weight such as a GRS or Hycar polymer, 5% by weight of a metallic oxide, ferrous or non-ferrous, a filler 27% by weight such as barytes, (barium sulphate), 5% by weight of a powdered or flaked graphite, and 3% by weight of a color pigment such as carbon black.

A batch of the material is thoroughly mixed and preformed under pressure to a desired shape with the formed shapes being positioned in a hydraulic molding press and subjected to 2,000 PSI pressure at a temperature of between 285° to 350° F. for a suitable time, such as ten minutes. The cured shapes are removed to an oven for post cure at a temperature of between 300° and 350° F. for a time of approximately 18 hours.

Those skilled in the art will observe that the quantities of the ingredients in the composition of the material may vary considerably, for example the spun blast furnace slag fibers may be present in quantities between 20% and 75% by weight, a total of the phenolic resin and its organic modifiers may be present in amounts between 13% and 33% by weight, the filler, barytes, may be present in amounts between 15% and 35% by weight, the metallic oxides may be present in amounts between 2% and 6% by weight, the graphite may be present in amounts between 3% and 8% by weight and factice may be present in amounts between 4% and 8% by weight. In addition to or in place of the carbon black pigment, zinc oxide may be used and the rubber, when present, acts as a binder and may be natural or synthetic or elastomeric material, which can be vulcanized or otherwise cured. When synthetic the rubber can be butyl, styrene-butadiene, or nitrile.

Those skilled in the art will recognize that the difficulties heretofore encountered in manufacturing brake block material incorporating asbestos fibers are overcome completely through the use of the composition of this invention. The spun blast furnace slag fibers are not readily airborne and under such circumstances as they may become airborne they do not comprise health hazards to manufacturing personnel. More importantly the spun blast furnace slag fibers in the composition result in a substantially improved heat resistant and wear resistant brake block product.

The friction material when comprised of only the spun blast furnace slag fibers, the phenolic resin or equivalent and its modifier and the barytes, forms very simple highly effective brake blocks for use in heavy duty vehicle brake applications.

Although but two embodiments of the present invention have been described, it will be apparent to those skilled in the art that various changes and modifications may be made therein without departing from the spirit of the invention, and having thus described our invention what we claim is:

1. An improved heat and wear resistant friction material comprising in approximate percent by weight:
   Spun blast furnace slag fibers: 20%–75%
   Phenolic Resin and Modifier: 13%–33%
   Barytes: 10%–35%.

2. The improved heat and wear resistant friction material of claim 1 wherein said modifier is organic.

3. The improved heat and wear resistant friction material of claim 1 wherein said modifier is GRS polymer.

4. The improved heat and wear resistant friction material of claim 1 and wherein rubber in approximate percent by weight between 3% to 9% is included.

5. An improved heat and wear resistant friction material comprising in approximate percent by weight:
Spun blast furnace slag fibers: 20%–75%
Phenolic Resin and modifier: 13%–33%
Barytes: 10%–35%
Graphite: 3%–8%
Carbon Black: 1%–4%
Metallic oxide: 2%–6%.

6. An improved heat and wear resistant friction material comprising in approximate percent by weight:
Spun blast furnace Slag fibers: 75%
Phenolic resin and modifier: 15%
Barytes: 10%.